US 6,711,309 B1

(12) United States Patent
Gan et al.

(10) Patent No.: US 6,711,309 B1
(45) Date of Patent: Mar. 23, 2004

(54) NOISE SUPPRESSION IN LIGHTWAVE COMMUNICATION SYSTEMS

(75) Inventors: Hongbing Gan, Carlton North (AU); Arthur James Lowery, Kew (AU); Richard David Lauder, Marourra (AU); Mark Sceats, Lilyfield (AU)

(73) Assignees: The University of Sydney, Sydney (AU); Telstra Corporation Limited, Melbourne (AU); The University of Melbourne, Parkville (AU)

( * ) Notice: Subject to any disclaimer, the term of this patent is extended or adjusted under 35 U.S.C. 154(b) by 0 days.

(21) Appl. No.: 09/890,307
(22) PCT Filed: Jan. 28, 1999
(86) PCT No.: PCT/AU99/00056
§ 371 (c)(1),
(2), (4) Date: Oct. 30, 2001
(87) PCT Pub. No.: WO00/45532
PCT Pub. Date: Aug. 3, 2000

(51) Int. Cl.[7] .............................................. G02F 1/295
(52) U.S. Cl. .................... 385/4; 385/1; 385/2; 385/3; 385/42; 385/47; 385/122; 359/278; 359/279; 359/337.1; 359/337.11; 372/6
(58) Field of Search ........................... 385/1–4, 42, 47, 385/122; 359/278, 279, 337.11, 337.1; 455/455; 372/6

(56) References Cited

U.S. PATENT DOCUMENTS

| | | | | |
|---|---|---|---|---|
| 4,922,096 A | * | 5/1990 | Brennan | 244/3.16 |
| 4,925,472 A | * | 5/1990 | Di Vita | 65/425 |
| 5,408,317 A | * | 4/1995 | Dyes et al. | 356/461 |
| 5,457,532 A | * | 10/1995 | August et al. | 356/460 |
| 5,493,623 A | * | 2/1996 | Frische et al. | 385/12 |
| 5,559,908 A | * | 9/1996 | August et al. | 385/12 |
| 5,781,300 A | * | 7/1998 | Strandjord et al. | 356/460 |
| 6,008,488 A | * | 12/1999 | Jarvis et al. | 250/227.23 |
| 6,014,217 A | * | 1/2000 | Sanders et al. | 356/461 |

FOREIGN PATENT DOCUMENTS

WO  WO9827406  6/1998  ........ G01D/5/353

* cited by examiner

Primary Examiner—Brian Healy
Assistant Examiner—Daniel Petkovsek
(74) Attorney, Agent, or Firm—Ladas & Parry

(57) ABSTRACT

An optical communications system comprises, among other things, a laser source; an optical waveguide interconnected to the laser source to carry an optical signal from the source to an optical receiver; an optical receiver interconnected to the optical waveguide for decoding the signal; and a mechanical modulator adapted to substantially continuously mechanically perturb a portion of the optical waveguide so as to reduce Rayleigh backscattering from the optical waveguide.

19 Claims, 6 Drawing Sheets

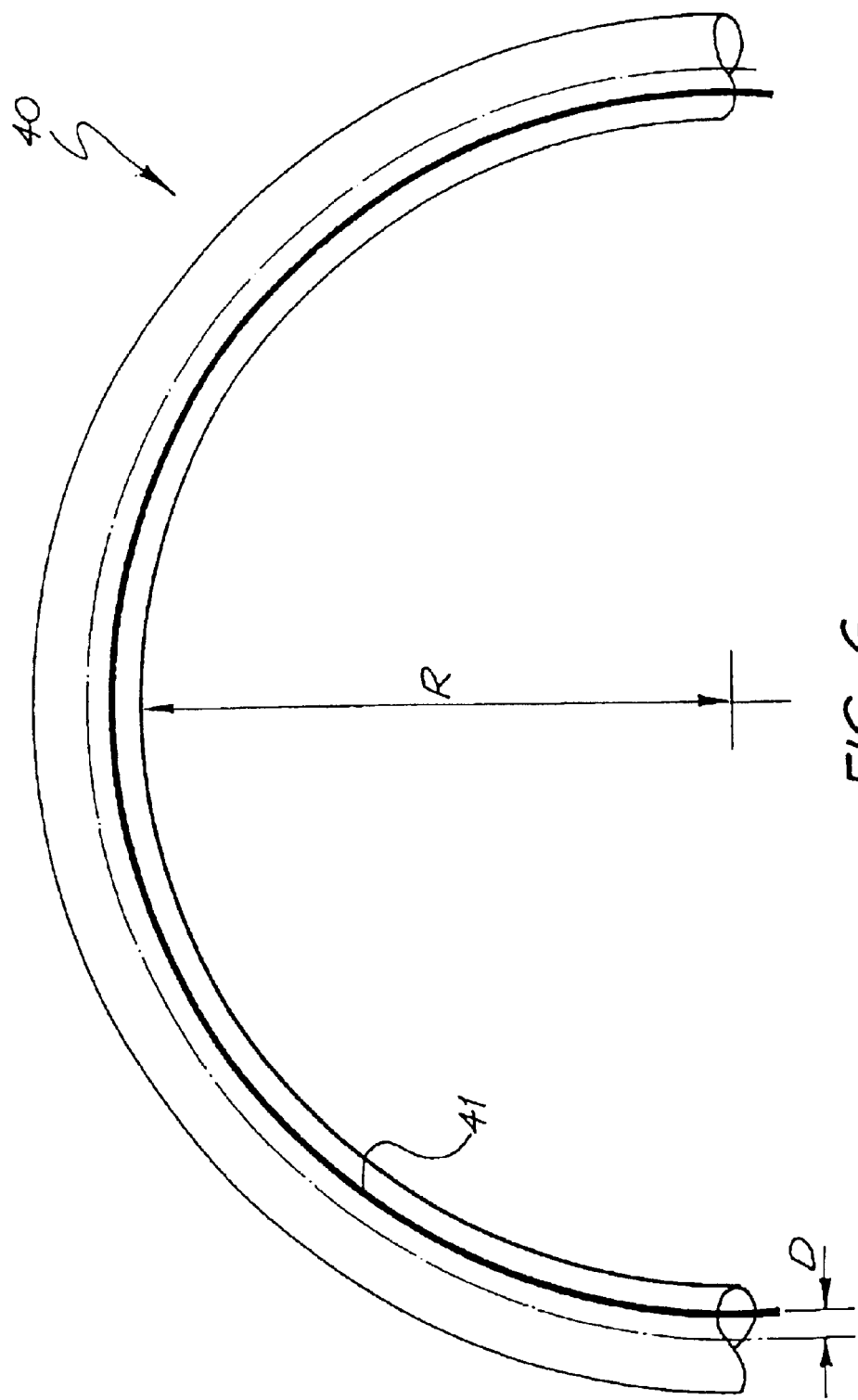

NOISE SUPPRESSION IN LIGHTWAVE COMMUNICATION SYSTEMS

FIELD OF THE INVENTION

The present invention relates to optical fibre communications systems and in particular, discloses a method of suppressing noise in an optical fibre communications system.

BACKGROUND OF THE INVENTION

In optical fibre telecommunications systems, a laser is modulated with a transmission signal with the output of the laser being fed over an optical fibre of quite some distance. At the end of the optic fibre a receiver is placed for receiving and decoding the transmitted signal.

Due to Rayleigh Backscattering (RB) from the fibre system (See K. D. Laviolette, "The impact of Rayleigh Backscatter induced noise on QPSK transmission with Fabry-Perot lasers' IEEE Photon. Technol. Lett., Vol 10, no. 11, pp 1644–1646, November 1998."), it is often the case that the fibre waveguide provides for optical feedback to the laser system which can in turn, in common with discreet reflections, introduce an instability in the laser and thereby degrade system performance. The presence of Rayleigh Backscattering normally requires the utilization of an optical isolator so as to isolate the feedback from the lazing system. The utilizing of optical isolators can dramatically increase the cost of an optical fibre telecommunications system.

It would be desirable to substantially reduce the effects of Rayleigh Backscattering without the need to utilize an optical isolator.

SUMMARY OF THE INVENTION

In accordance with a first aspect of the present invention, there is provided in an optical fibre lasing system including a feedback laser system interconnected with an optical waveguide, such as an optical fibre, a method of reducing the feedback effects from Rayleigh backscattering comprising the step of: subjecting portions of the optical waveguide to low frequency mechanical vibration so as to reduce feedback from Rayleigh backscattering of the optical waveguide.

The Low frequency mechanical vibration can comprise a continuous oscillation in the range of 300 Hz to 2500 Hz or 300 Hz to 40 KHz.

The mechanical vibration of the optical waveguide preferably occurs substantially adjacent to the interconnection with the laser system.

In accordance with a further aspect of the present invention, there is provided an optical communications system comprising a laser source; an optical waveguide interconnected to the laser source to carry an optical signal from the source to an optical receiver; an optical receiver interconnected to the optical waveguide for decoding the signal; and a mechanical modulator adapted to substantially continuously mechanically perturb a portion of the optical waveguide so as to reduce Rayleigh backscattering from the optical waveguide.

The mechanical modulator can be in contact with the optical waveguide or the mechanical modulator can emit an audio signal in the presence of the optical waveguide. The mechanical modulator preferably interacts with an initial portion of the optical waveguide substantially adjacent the interconnection with the feedback laser.

The optical waveguide can comprise an optical fibre and further preferably can include a portion having an offset core with the mechanical modulator perturbing the portion.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIG. 6 illustrates the utilization of an offset core fibre in an alternative embodiment.

DESCRIPTION OF PREFERRED AND OTHER EMBODIMENTS

In a first embodiment, the Rayleigh Backscattering feedback is suppressed through the utilization of an audio frequency external optical phase modulation. The result is the suppression of the noise tones and the restoration of the laser linewidth. The utilization of the audio frequency modulation allows for effective operation of Fabry-Perot lasers without utilization of an optical isolator.

Figure 1:
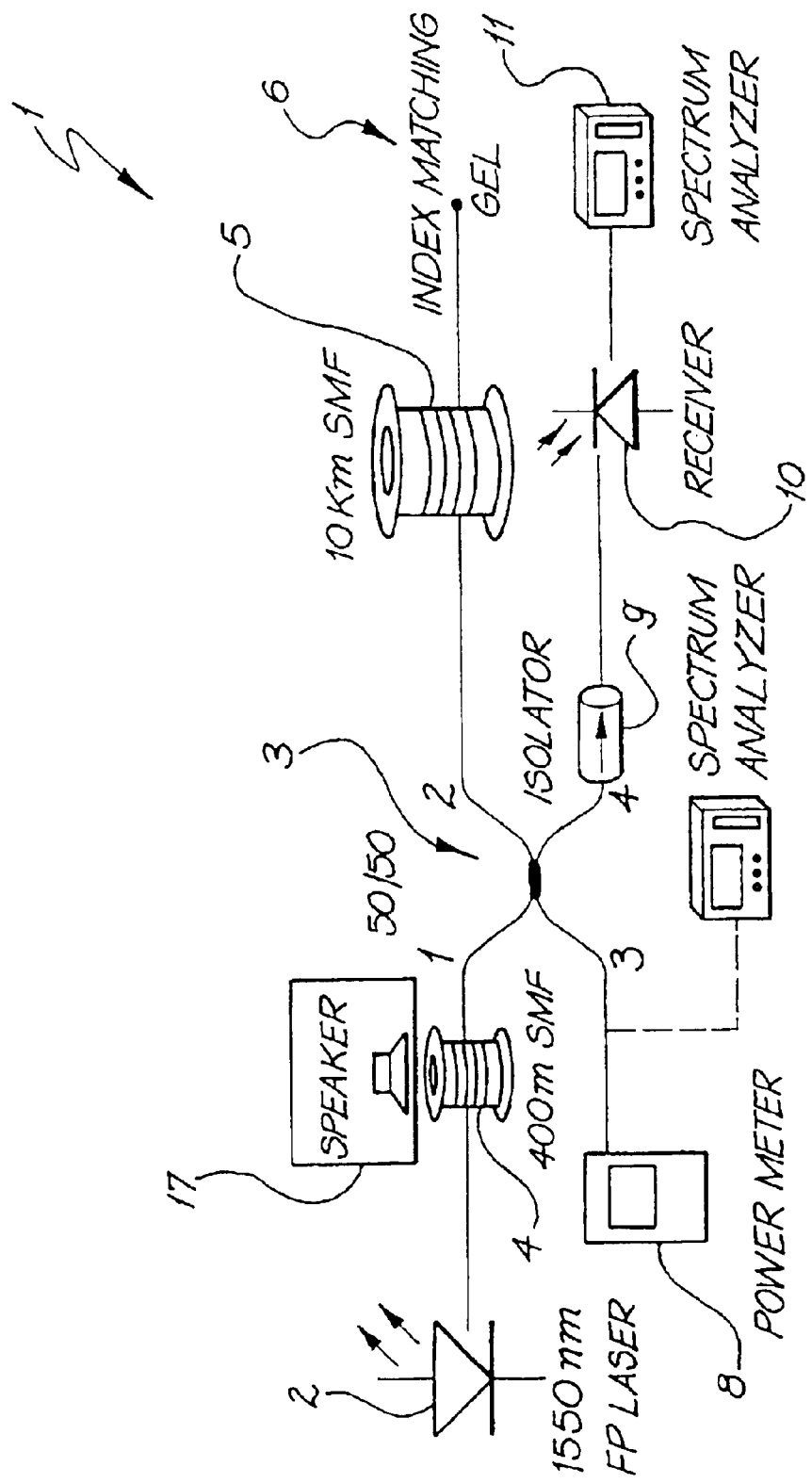
FIG. 1 illustrates schematically the arrangement of a first embodiment of the present invention.

A first example embodiment was constructed in accordance with the arrangement 1 as illustrated in FIG. 1. A Fujitsu FLD150C2KM 1550-nm Fabry-Perot laser 2 was biased with 25-mA dc current and generated −2.5 dBm optical power. Its output was coupled to port 1 of a 50/50 coupler 3 via 400 m of standard single-mode fibre (SMF) 4. Port 2 of the coupler was fusion spliced to 10 km of standard SMF 5 with the fibre's far end 6 immersed in index matching gel to suppress Fresnel reflection; thus RB was the dominant feedback to the unisolated FP laser 2. Port 3 of the coupler was used to monitor the RB using power meter 8. Port 4 of the coupler was used to monitor the laser output using an isolator 9, a receiver 10 and spectrum analyzer 11.

Figure 2:
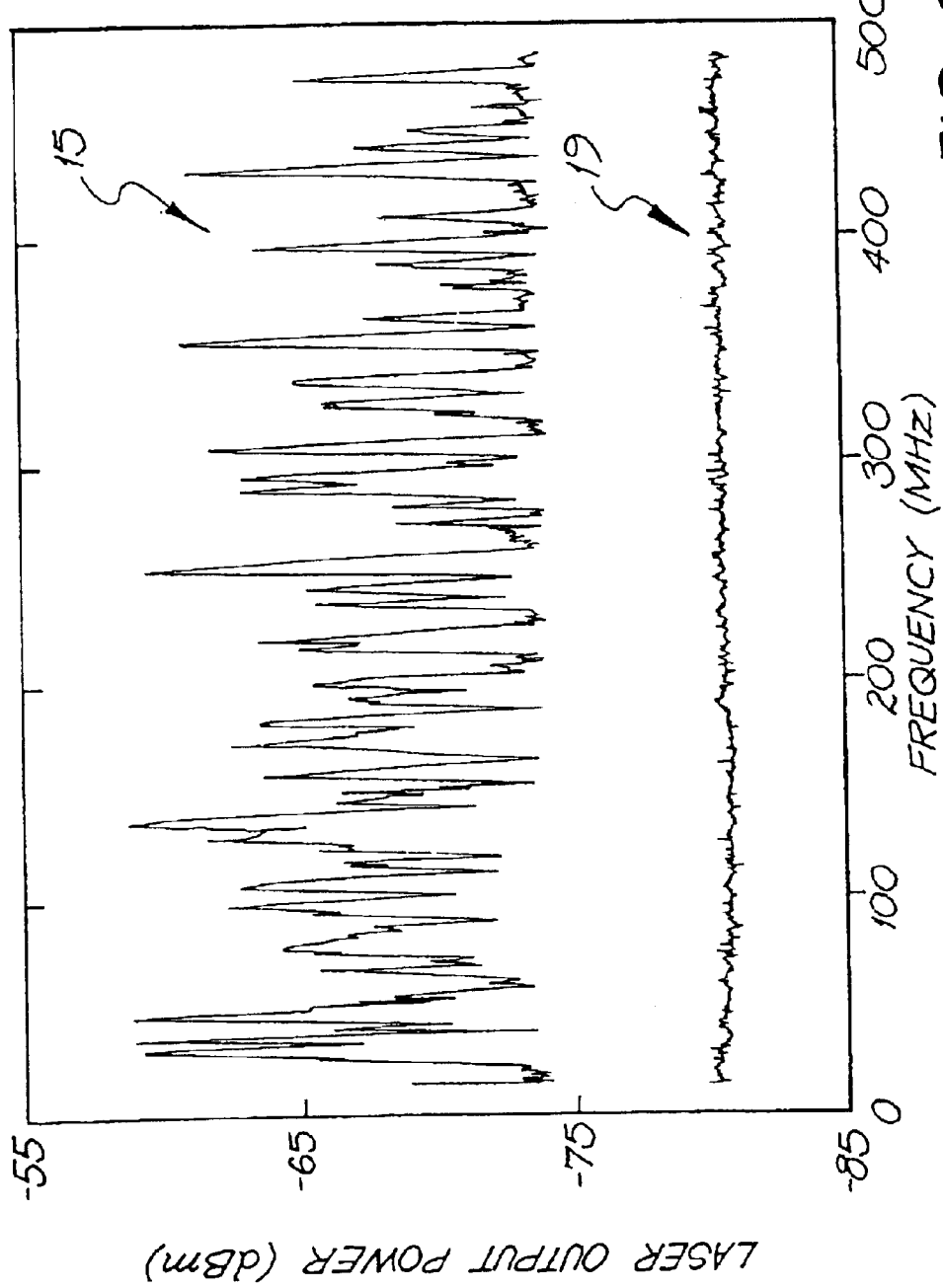
FIG. 2 illustrates the laser output power frequency spectrum (with a 2 MHz resolution bandwidth) with and without the present invention.
Figure 3:
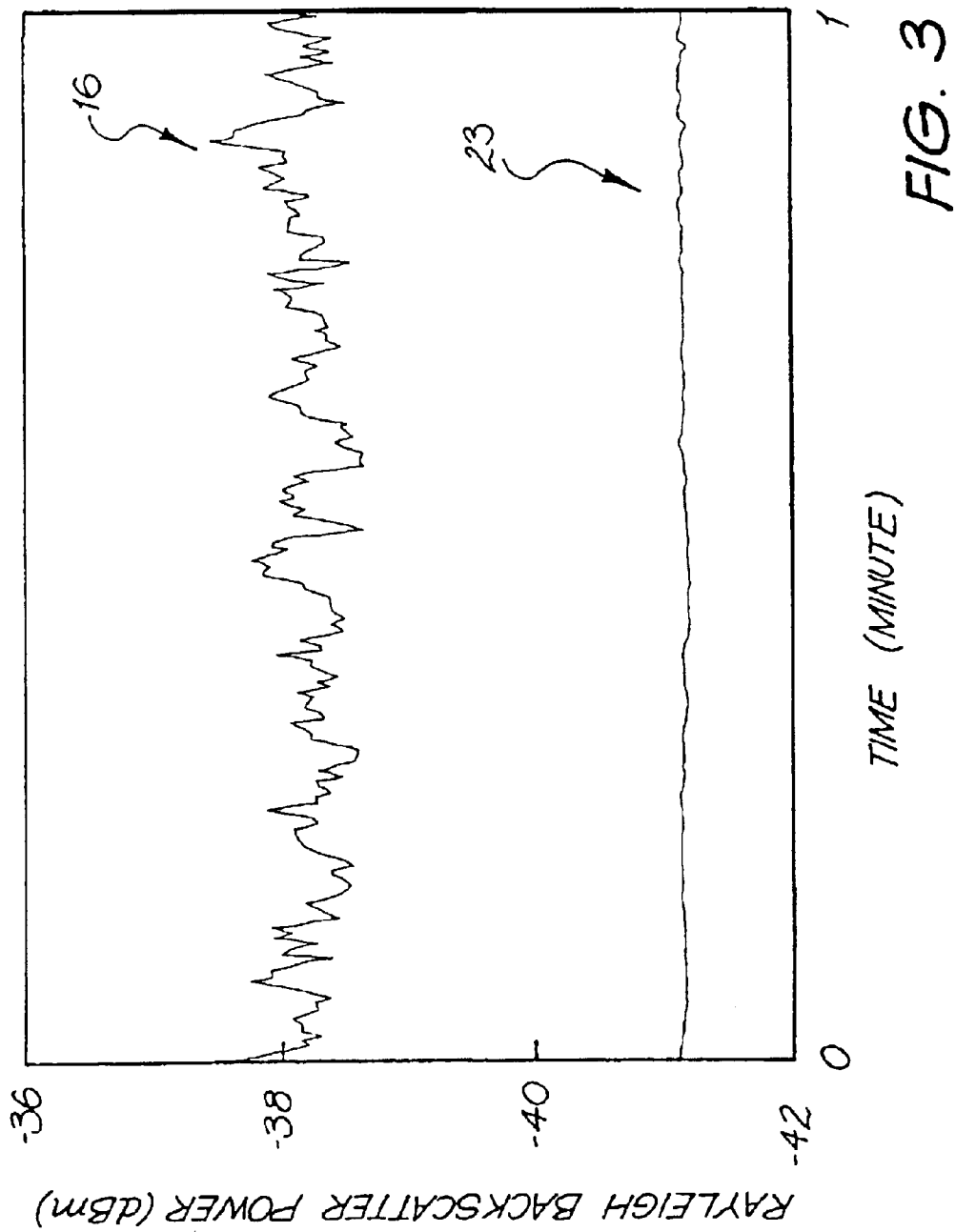
FIG. 3 illustrates the Rayleigh backscatter power with respect to time, with and without the present invention.

Firstly, the effects of RB on the unisolated laser were measured. The RF spectrum of the laser output is shown 15 in FIG. 2 and showed random frequency tones as high as 20 dB above the noise floor from dc to 500 MHz when the Laser was subject to RB. The "maxholding" function of the spectrum analyzer was used for one minute. To show that these random frequency tones were caused by RB, a 15-dB bending loss was applied at the transmission end of the 10-km fibre and this removed these tones. These tones are thought to be ascribed to mode hopping between laser modes created by the laser cavity locking to the Rayleigh backscatter external distributed cavity. This distributed cavity is through to result from a superposition of the reflections from the many scattering centres. The erratic nature of the backscatter causes changes in this external distributed cavity and causes a transition to occur within the laser cavity as it follows these changes. During a transition, the laser is thought to have two lasing frequencies, and the RF tones are caused by the mixing of these at the photodiode detector. The laser linewidth was estimated to be around 1 kHz by measuring the width of RF tones when the laser was subject to RB. Large linewidth narrowing might be explained as the RB establishes a narrow bandwidth reflection. The laser locks to this reflection and then has a very narrow linewidth due to the long effective cavity. The absolute power level of the RB monitored from port 3 is shown 16 in FIG. 3 and fluctuated on a time-scale comparable to 1 sec.

Figure 4:
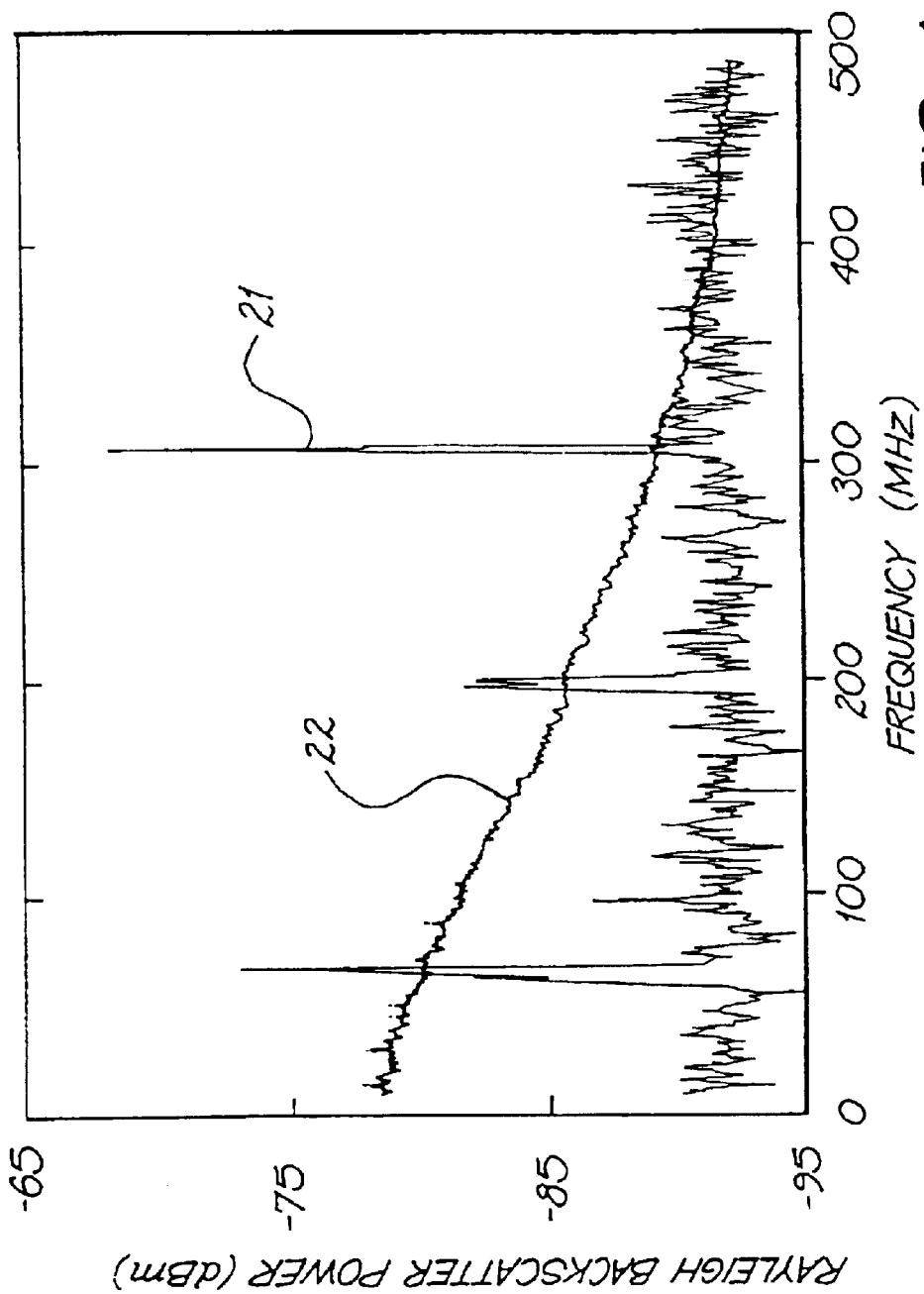
FIG. 4 illustrates the Rayleigh backscatter power frequency spectrum (with a 2 MHz resolution bandwidth) with and without the present invention.

Secondly, a 0.25-W loudspeaker 17 seated on the fibre spool 4 was driven by a 500-Hz 150-mA electrical signal. The electrical input power was 180 mW and the generated audio output power was 58 dB. It is thought that, when an acoustic wave is incident on the fibre, the resulting changes in Fibre length, diameter and refractive index cause a variation in optical phase due to the photoelastic effect. Thus the laser output is optical-phase modulated by the acoustic wave, as was the backscattered light. Under the optical-phase modulation, the RF spectrum of laser output showed no RF tones as shown 19 in FIG. 2 measured at port 4 of the coupler. The RF spectrum of RB, as shown in FIG. 4, was measured at port 3 of the coupler. The first plot 20 shows the RF spectrum of the RB without the presence of phase modulation. In this case the laser linewidth is too small to be directly measured, but the RF tone bursts 21 caused by the backscatter of two coexisting narrow linewidth laser outputs beating at the receiver can be seen. The laser goes to a free running laser 22 when the phase modulation was present. The RF spectrum of RB (showing laser linewidth because RB is interferometric multipath signal) indicated that linewidth-narrowing was also suppressed; the laser linewidth increased to 110 MHz. As shown 23 in FIG. 3, the RB power monitored from port 3 was reduced by 3 dB to −41 dBm and the second time-scale power fluctuation disappeared.

Finally, an optical isolator was inserted immediately after the FP laser to prevent RB from entering the laser. With the isolator in place, it was observed that the RF spectrum, line width and power level were substantially the same as when the fibre was optical-phase modulated by an acoustic wave. Thus the acoustic (optical-phase) modulation mimics the optical isolator in suppressing the unwanted interaction between the RB and the laser, which causes the RF noise tones.

In an alternative embodiment, a shorter length of fibre was utilized and an attempt made to directly couple the acoustic vibrations into the fibre. An example of this embodiment is shown schematically in FIG. 5 wherein a speaker 30 was directly coupled to a short length of fibre 31 which was fixed 32, 33 around the speaker 30. The fibre 31 was held very taught between the fixing points 32, 33 and a lip of the speaker 30. The fibre 31 included a standard 900 micron coating for protection. The arrangement of FIG. 5 was found to successfully suppress RF tones utilizing acoustic frequencies from 300 Hz to 2500 Hz. Further operation up to 17 KHz was also found to suppress RF tones.

Figure 5:
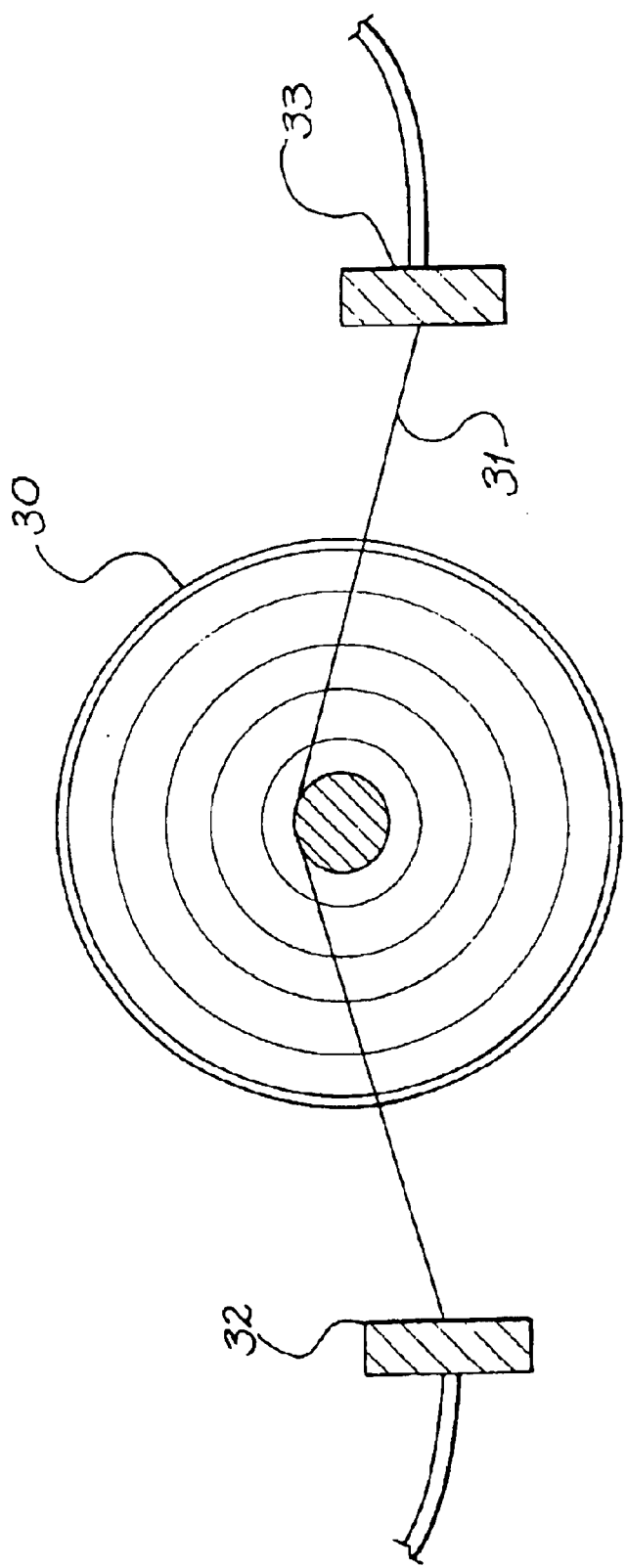
FIG. 5 illustrates an alternative embodiment.

Often the optimum frequency to drive the acoustic wave at will be the resonant frequency of the total arrangement of FIG. 5. If a particular acoustic frequency is required than the fibre/speaker assembly can be appropriately designed.

It will therefore be evident that the foregoing embodiments include an external bending or stretching of the fibre to modulate the refractive index at a lower frequency. The stretching arrangement of FIG. 5 often requires considerable attention to achieve and the set up can be unduly complicated in trying to ensure that the fibre does not slip. In practice, the easiest approach is to vibrate the fibre by bending it around the speaker. However the phase changes can still be very small although the mechanical energy required to bend a fibre is also very small.

One way to substantially enhance the response to bending is to utilize an offset core fibre.

In bending a standard fibre with a concentric core, the first order response is zero because compression on one side of the core is balanced by expansion on the other. If the core is displaced away from the centre by at least one core diameter (ca 10 microns), then a first order response is obtained since all the core is in compression or expansion at the same time. The index change is substantially polarisation independent as the stress is axial.

Turning to FIG. 6, there is illustrated a single mode optical fibre 40 having an offset core 41 offset a length D from a central axis, with the fibre being bent with a radius R. The index change increases with the offset D and with the inverse of the bend radius R. Through the utilization of a offset core fibre in the arrangement of FIG. 5, substantial enhancements can be achieved. Of course other forms of mechanical oscillator could be used. For example, piezo-electric oscillators or other forms of micro mechanical oscillators could be utilized.

The foregoing embodiments can be implemented in a optical fibre communications network as part of a new network deployment or as a refitting of an old network to improve an existing network that is operating in an unisolated manner. In an old network, it may be part of the constraints that no breaking or resplicing of the current fibre can be undertaken. In this example, the arrangement of FIG. 5 can be utilized with an axial core fibre.

Where a stand alone device is to be provided then a device having an offset core fibre can be provided for splicing into the relevant portions of a communication network as a "retrofitted" device otherwise an acoustic modulation of the inplace fiber may be provided without the need for a splicing of the network and without the necessity for shutting down the network for the period of instalment.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A method of reducing the feedback effects from Rayleigh backscattering in an optical fibre lasing system including a laser system interconnected with an optical waveguide, comprising the step of:

subjecting portions of said optical waveguide to a continuous low frequency mechanical oscillation so as to reduce feedback from Rayleigh backscattering of said optical waveguide.

2. A method as claimed in claim 1 wherein said low frequency is in the range of 300 Hz to 1200 Hz.

3. A method as claimed in claim 1 wherein said low frequency is in the range of 300 Hz to 40 KHz.

4. A method as claimed in claim 1 wherein said optical waveguide comprises an optical fibre.

5. A method as claimed in claim 1 wherein said mechanical oscillation of said optical waveguide occurs substantially adjacent to the interconnection with the laser system.

6. An optical communications system comprising:

a laser source;

an optical waveguide interconnected to said laser source to carry an optical signal from said source to an optical receiver;

an optical receiver interconnected to said optical waveguide for decoding said signal;

a mechanical modulator adapted to substantially continuously mechanically perturb a portion of said optical waveguide so as to reduce Rayleigh backscattering from said optical waveguide.

7. An optical communications system as claimed in claim 6 wherein said mechanical modulator comprises a mechanical oscillator.

8. An optical communications system as claimed in claim 7 wherein said mechanical oscillator oscillates at a frequency in the range of 300 Hz to 40 Khz.

9. An optical communications system as claimed in claim 7 wherein said mechanical oscillator oscillates at a frequency in the range of 300 Hz to 2500 Hz.

10. An optical communications system as claimed in claim 6 wherein said mechanical modulator is in contact with said optical waveguide.

11. An optical communications system as claimed in claim 6 wherein said mechanical modulator emits an audio signal in the presence of said optical waveguide.

12. An optical communications system as claimed in claim 6 wherein said mechanical modulator interacts with an initial portion of said optical waveguide substantially adjacent said interconnection with said laser.

13. An optical communications system as claimed in claim 6 wherein said optical waveguide comprises an optical fibre and further includes a portion of an optical fibre having an offset core and said mechanical modulator perturbs said portion.

14. An optical communications system as claimed in claim 13 wherein said portion is bent into a coil.

15. A method of reducing the feedback effects from Rayleigh backscattering in an optical fibre lasing system including a laser system interconnected with an optical waveguide, comprising the step of:

subjecting portions of said optical waveguide to mechanical vibration in the frequency range 300 Hz to 40 KHz so as to reduce feedback from Rayleigh backscattering of said optical waveguide.

16. A method as claimed in claim 15 wherein said low frequency mechanical vibration comprises a continuous oscillation.

17. A method as claimed in claim 15 wherein said mechanical vibration is in the frequency range of 300 Hz to 1200 Hz.

18. A method as claimed in claim 15 wherein said optical waveguide comprises an optical fibre.

19. A method as claimed in claim 15 wherein said mechanical vibration of said optical waveguide occurs substantially adjacent to the interconnection with said laser system.

* * * * *